(12) United States Patent
Lu et al.

(10) Patent No.: US 8,793,304 B2
(45) Date of Patent: Jul. 29, 2014

(54) DIFFERENTIATED MANAGEMENT OF WIRELESS CONNECTIVITY

(75) Inventors: Yi Lu, Sammamish, WA (US); Olivier Contant, Redmond, WA (US); Wei Zhao, Bellevue, WA (US); Anirban Banerjee, Issaquah, WA (US); Abhishek Abhishek, Woodinville, WA (US); Yue Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 11/601,088

(22) Filed: Nov. 17, 2006

(65) Prior Publication Data

US 2008/0086529 A1 Apr. 10, 2008

Related U.S. Application Data

(60) Provisional application No. 60/849,571, filed on Oct. 5, 2006.

(51) Int. Cl.
*G06F 15/16* (2006.01)
*H04L 29/08* (2006.01)
*H04L 29/06* (2006.01)
*H04W 12/08* (2009.01)

(52) U.S. Cl.
CPC ............ *H04L 63/101* (2013.01); *H04L 67/306* (2013.01); *H04L 69/18* (2013.01); *H04W 12/08* (2013.01)
USPC .............................. 709/203; 709/208; 340/1.1

(58) Field of Classification Search
USPC ......... 709/249, 227, 225, 223, 219, 206, 204, 709/203, 217, 250, 248, 246, 245, 239, 238, 709/232, 230, 224, 218, 207, 205, 221; 370/395.2, 352, 342, 338, 337, 331, 370/469, 466, 434, 408, 401, 400, 328, 313, 370/282, 254; 726/6, 27, 12, 5, 3, 23, 22, 726/15, 4, 11; 725/133, 115, 112
See application file for complete search history.

(56) References Cited

U.S. PATENT DOCUMENTS

| | | | | |
|---|---|---|---|---|
| 5,220,655 | A * | 6/1993 | Tsutsui ........................ | 709/229 |
| 5,689,642 | A * | 11/1997 | Harkins et al. ................ | 709/207 |
| 7,280,529 | B1 * | 10/2007 | Black et al. ................... | 370/352 |
| 2005/0135315 | A1 * | 6/2005 | Sinha ............................ | 370/338 |

(Continued)

OTHER PUBLICATIONS

Intel Corporation, "Enterprise Grade Wireless LAN Client, Intel® PROSet/Wireless Software 9.0", White paper, 2004, 10 pages.

(Continued)

*Primary Examiner* — David Lazaro
*Assistant Examiner* — Charles Murphy
(74) *Attorney, Agent, or Firm* — Andrew Sanders; Micky Minhas

(57) ABSTRACT

In some embodiments, a wireless management service provides the capability to manage connectivity between a device and one or more wireless networks on a differentiated basis. For example, network profiles may be managed in a way that is influenced by the identity of the user, such that profiles which are customized for a specific user may be established. Connectivity may also be managed in a way that is influenced by a session type ongoing on a device, such that when certain events occur (e.g., a request by one user to connect to or disconnect from a wireless network is processed), wireless connectivity employed by other users sharing the device is appropriately managed.

14 Claims, 13 Drawing Sheets

(56) References Cited

U.S. PATENT DOCUMENTS

| | | | |
|---|---|---|---|
| 2005/0260996 A1* | 11/2005 | Groenendaal | 455/445 |
| 2006/0209773 A1* | 9/2006 | Hundal et al. | 370/338 |
| 2008/0034071 A1* | 2/2008 | Wilkinson et al. | 709/220 |

OTHER PUBLICATIONS

Intel Corporation, "Managing Wireless Clients with the Administrator Tool, Intel® PROSet/Wireless Software 10.1", White paper, 2006, 15 pages.

* cited by examiner

DIFFERENTIATED MANAGEMENT OF WIRELESS CONNECTIVITY

RELATED APPLICATIONS

This application claims priority under 35 U.S.C. §119(e) to U.S. Provisional Application Ser. No. 60/849,571, entitled "Differentiated Management of Wireless Connectivity," filed on Oct. 5, 2006, which is incorporated herein by reference in its entirety.

FIELD OF INVENTION

This invention relates generally to the management of wireless computing configuration and connectivity.

BACKGROUND OF INVENTION

Most businesses have recognized substantial benefits operating in a networked computing environment. For example, establishing local area networks (LANs) allows businesses to enable employees to share networked resources, such as printers, file servers, modems, email servers, etc., while distributing computing power amongst individual workstations. Home computing environments have also begun to capitalize on the benefits of networking, as more and more households have more than one computer. For example, networked resources such as printers may be shared among members of a household.

Until recently, networks have been hard-wired, requiring users wishing to connect to the network to connect a computing device to a network connection outlet using cabling. This obviously limited users' mobility. This and other limitations imposed by hardwired networks have been mitigated in part by wireless networks, which provide increased flexibility and enable users to access networked resources from any location within range of a wireless LAN. As such, users no longer need to restrict themselves to particular physical locations where network connection outlets are provided and/or carry network cabling to connect to a network. Wireless networks also provide significant advantages for home computer users, who may now access networked resources from any convenient location in or nearby the home.

Increasingly, computing devices are shared by more than one user, each of whom may wish to take advantage of the benefits of wireless computing. For example, in many businesses, more than one user (e.g., who each work different shifts) share a desktop computer, terminal, or other computing device. In many home computing environments, computers are shared by multiple members of a family. Typically, a wireless management service executing on the computing device (e.g., implemented by the operating system executing on the device) provides a facility for managing connectivity by the device to available wireless network(s). Settings are typically defined in a wireless network profile, and may include connection and security settings which are employed for connections to the network(s).

Conventionally, wireless management services enable any user of the device to modify settings governing connectivity to wireless networks, regardless of the user's privileges to access and/or modify other networked resources. For example, a user who does not have access privileges to access or modify a particular file or device accessible via the network may conventionally modify connectivity settings specified by a wireless management service. Also, in conventional arrangements, a network profile that is set up or modified by one user of a device is employed by all other users of the device, unless another user modifies the profile before connecting. As a result, if one user of a device modifies a network profile to, for example, specify a preference for connecting to a non-secure network, all users of the device would connect to the same non-secure network unless they altered the profile. Consequently, a malicious user could set up a network profile to automatically connect to a particular network which enables malicious activity to occur when other users employ the device, such as capturing personal data or credential information from the other users.

Some conventional wireless management services guard against such malicious activity by requiring that users enter a password before allowing them to modify a network profile. However, this approach is less than optimal for several reasons. First, the same password is employed for each user of the device, such that the password is not as secure as possible, and changes to the password are difficult to administer. For example, to keep the password secure, an administrator must keep track of all users who have access to the password, and change the password each time one of those users should no longer have access. The user must also enter the password every time he or she wishes to change the network profile.

SUMMARY OF INVENTION

In accordance with some embodiments of the invention, a wireless management service is provided which provides the capability to manage wireless connectivity on a differentiated basis, such as in a manner which is influenced by the identity of the user.

For example, some embodiments delineate authority to set up, manage and/or modify network profiles based on the user's identity. In some embodiments, the user's identity may be defined to the service via an account which is assigned to the user, although the invention is not limited to such an implementation. Some embodiments also, or alternatively, provide the ability to create and manage network profiles that are specific to individual users (hereinafter referred to as "per-user" profiles), which may be employed automatically when the considered user logs on to a device and initiates a connection to a wireless network. As such, embodiments of the invention may prevent malicious users from modifying network profiles on a device in ways that place other users of the device at risk.

In some embodiments, a wireless management service also enables the creation, management and use of network profiles that are usable by all users of a device (hereinafter referred to as "all-user" profiles). In some embodiments, a security function allows only authorized users (e.g., as defined by the users' credentials) to create or modify all-user profiles. In this respect, most operating systems associate each user with credentials which are defined at the time of account creation and assigned for use when the considered user logs into the system. The credentials serve as a certificate for the user and remain associated with the user throughout a login session. In embodiments wherein a security function employs a credential to define a user's access to network profiles, the right to create, modify, delete and employ profiles on a device may be manageable on an individual or group basis.

The invention is not limited to differentiating the management of network profiles based on user identity, or on any other particular criterion or criteria. For example, some embodiments provide the capability to manage network profiles in a manner which is influenced by the interface (e.g., a wireless network card in a device) used to initiate wireless connectivity. For example, some embodiments provide the capability to create and manage per-interface profiles, which may be usable on a single interface to connect to wireless networks. Some embodiments also, or alternatively, provide the capability to create and manage all-interface profiles, which may be usable on a group of interfaces, such as all interfaces in a device. Differentiation of management capabilities may be based on any suitable criterion or combination of criteria, as the invention is not limited to any particular implementation.

In some embodiments, differentiated management of wireless connectivity is not limited to the management of network profiles. For example, some embodiments provide the capability to manage the handling of connectivity events on a device in a manner which is influenced by the session type(s) ongoing on the device when a connectivity event is attempted. As used herein, the term "session type" refers to whether a device is actively being used and in what manner, and is described more fully in the sections that follow. In some embodiments, differentiation based on session type may be useful when multiple users employ the same device in overlapping timeframes (e.g., where a terminal services user and an active console user employ a device simultaneously). For example, differentiation based on session type may ensure that connectivity events are handled in a manner which ensures that connectivity is not lost by an active console user when another type of session is also ongoing on a device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
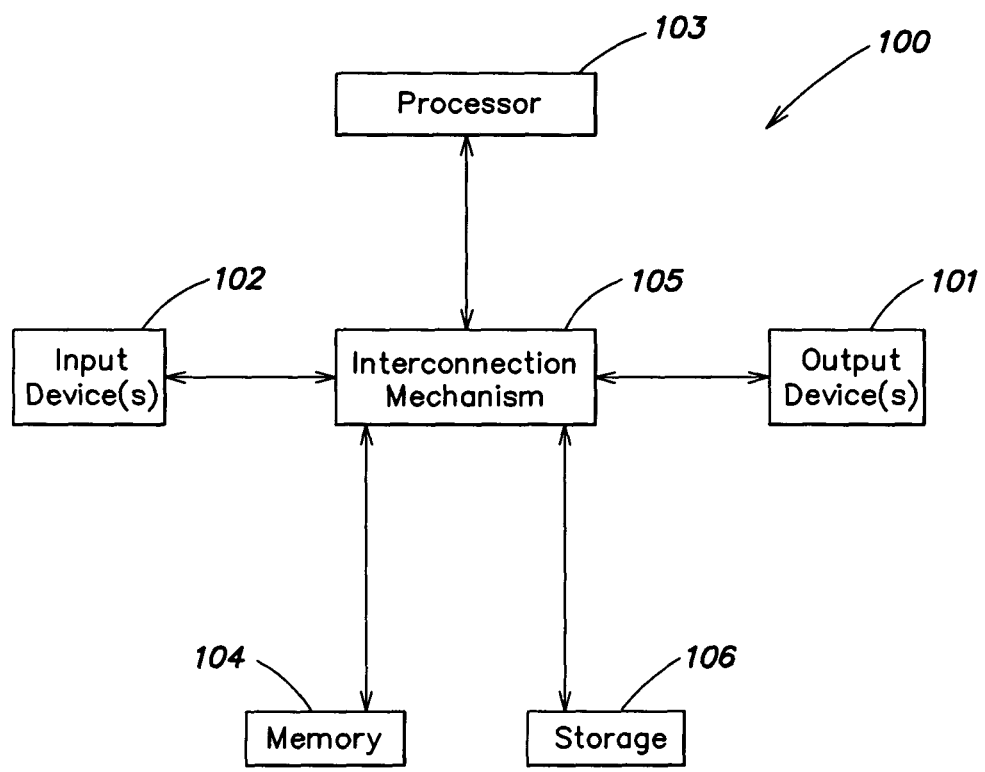
FIG. 1 is a block diagram of an exemplary computer system which may be used to implement aspects of embodiments of the invention.

In accordance with some embodiments of the present invention, a wireless management service is provided which provides the capability to manage wireless connectivity on a differentiated basis. For example, some embodiments provide the capability to set up, manage and/or modify network profiles in a manner which is influenced by the identity of the user (e.g., as defined by a network account assigned to the user). For example, some embodiments provide the capability to create and manage per-user network profiles, which may be employed automatically when a particular user logs on to a device and initiates a connection to a wireless network, and all-user network profiles, which may be usable by a group of users (e.g., all users) that employ a device. A security function may be employed to restrict user access (e.g., as defined by user credentials) to all-user profiles, such that an unauthorized user is not permitted to set up an all-user profile that may be inadvertently employed by a user of a device. In some embodiments, all-user profiles and per-user profiles may both be employed on a device.

Differentiation of management capabilities may be based on any suitable criterion or criteria. For example, some embodiments provide the capability to manage connectivity (e.g., set up, manage and/or modify network profiles) in a manner which is influenced by the interface (e.g., the wireless network card in a device) used to initiate wireless connectivity. For example, some embodiments provide the capability to create and manage per-interface profiles, which may be usable by a single interface, and all-interface profiles, which may be usable by all interfaces in a device. Differentiation of management capabilities may be based on any suitable criterion or combination of criteria, as the invention is not limited to any particular implementation.

In some embodiments, differentiated management of wireless connectivity is not limited to the management of wireless network profiles, and may include any suitable management function. For example, some embodiments provide the capability to manage the handling of connectivity events on a device in a manner which is influenced by the session type(s) in progress on the device when a connectivity event is attempted. For example, when multiple users employ the same device in overlapping timeframes (e.g., when a terminal services user and an active console user employ a device simultaneously), some embodiments of the invention enable events to be handled in a manner that ensures that connectivity is not lost, for example, by one user (e.g., an active console user) when another user (e.g., a terminal services user) initiates a particular connectivity event.

These and other features are described more fully in the description that follows. The invention is not limited in its application to the details of construction and arrangement of components set forth in the following description, or illustrated in the drawings. The invention is capable of other embodiments and of being practiced or of being carried out in various other ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Although not required, aspects of embodiments of the invention are described herein as being implemented via computer-executable instructions, such as program modules, etc., which are executable by a computing device. Generally, program modules include routines, programs, objects, components, data structures, etc. that perform particular tasks or implement particular data types. As such, the various elements of embodiments, either individually or in combination, may be implemented as a computer program product which includes a computer-readable medium on which instructions are stored for access and execution by a processor. When executed by the computer, the instructions instruct the computer to perform the various steps of the process.

Those skilled in the art will appreciate that the invention may be practiced using, or implemented on, other system configurations than those described herein. For example, embodiments of the invention may be implemented in computer programs, hardware, firmware, or any combination thereof, which may execute on or be implemented via handheld devices, multi-processor systems, microprocessor-based or programmable consumer electronics, network PCs, minicomputers, mainframe computers, and the like. Further, the invention may be practiced in distributed computing environments where different tasks are performed by different components, executing on or implemented via devices linked through a communication network. For example, in a distributed computing environment, program modules may be executed on networked devices and located in local and/or remote memory storage devices.

Various aspects of the systems and methods for practicing features of the invention may be implemented on one or more computer systems, such as the exemplary computer system 100 shown in FIG. 1. Computer system 100 includes input device(s) 102, output device(s) 101, processor 103, memory system 104 and storage 106, all of which are coupled, directly or indirectly, via interconnection mechanism 105, which may comprise one or more buses, switches, and/or networks. The input device(s) 102 receive input from a user or machine (e.g., a human operator), and the output device(s) 101 display or transmit information to a user or machine (a liquid crystal display). The processor 103 typically executes a computer program called an operating system (e.g., a Microsoft Windows®-family operating system, such as Microsoft Windows Vista®, or any other suitable operating system) which controls the execution of other computer programs, and provides scheduling, input/output and other device control, accounting, compilation, storage assignment, data management, memory management, communication and data flow control. Collectively, the processor and operating system define the platform for which software in other computer programming languages are written.

The processor 103 may execute one or more computer programs to implement various functions. These computer programs may be written in any type of computer programming language, including a procedural programming language, object-oriented programming language, macro-language, or combination thereof. These computer programs may be stored in storage system 106. Storage system 106 may hold information on a volatile or non-volatile medium, and may be fixed or removable. Storage system 106 is shown in greater detail in FIG. 2.

Figure 2:
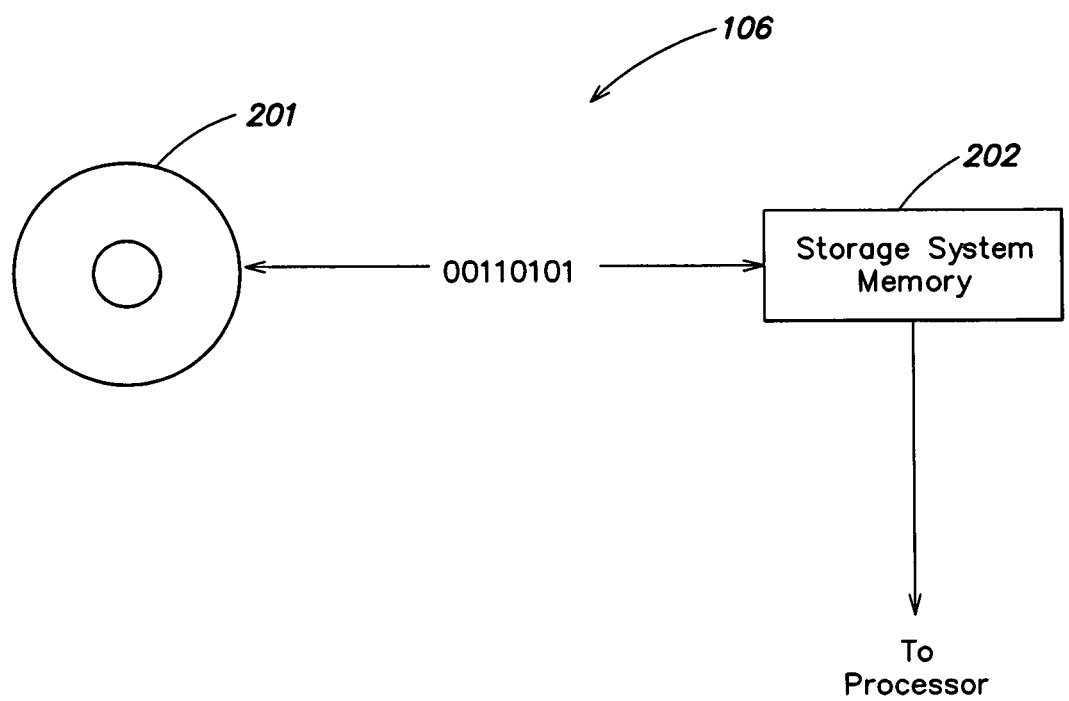
FIG. 2 is a block diagram of an exemplary computer memory on which instructions implementing aspects of embodiments of the invention may be stored.

Storage system 106 typically includes a computer-readable and writable non-volatile recording medium 201, on which signals are stored that define a computer program or information to be used by the program. The medium may, for example, be a disk or flash memory. Typically, in operation, the processor 103 causes data to be read from the non-volatile recording medium 201 into a volatile memory 202 (e.g., a random access memory, or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is also not limited to a particular memory system 104 or storage system 106.

Illustrative features of a wireless management service which is implemented in accordance with embodiments of the invention are described in the sections that follow.

Creation and Management of Network Profiles

Embodiments of the invention include a wireless management service which provides differentiated capability to manage connectivity to wireless networks, such as by creating, managing and using network profiles. In some embodiments, this capability is differentiated based on the identity of the user, such that different users may have different abilities to create, manage and use different network profiles.

In some embodiments, a wireless management service enables the creation of network profiles which are usable by only a particular user (i.e. per-user profiles). In some embodiments, a per-user profile may only be accessed and modified by the user that creates it. By employing per-user profiles on a device, users of the device may protect themselves from modifications to network profiles made by other users of the device. Embodiments of the invention may also, or alternatively, enable the creation and management of network profiles that are usable by a group of users (i.e. all-user profiles). In some embodiments, the ability to create, manage and use all-user profiles is governed by a security function which employs the user's credentials to determine whether a user is authorized to create, manage and use an all-user profile.

Figure 3:
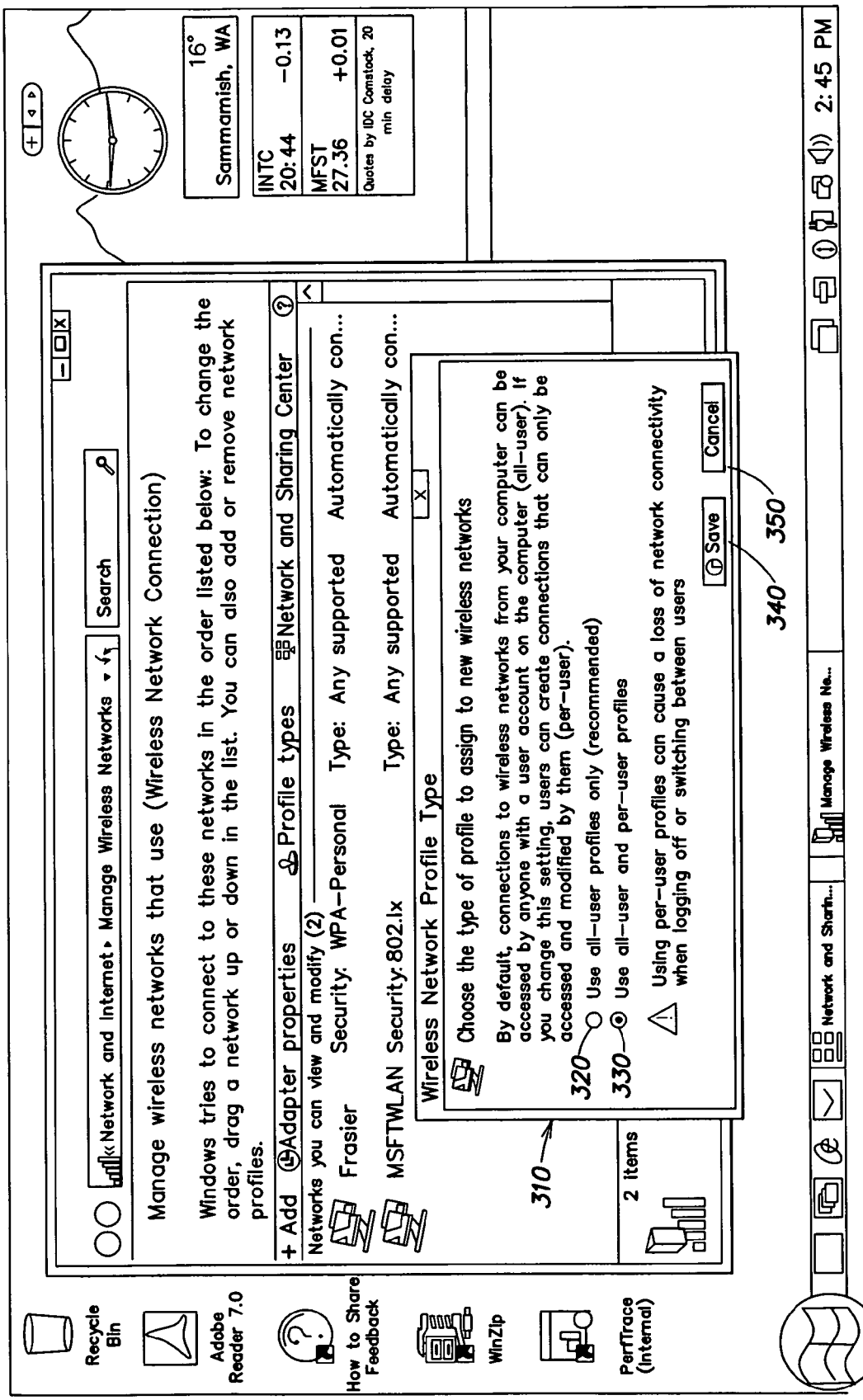
FIG. 3 is a representation of an exemplary user interface which a user may employ to specify one or more characteristics of a wireless network profile, in accordance with embodiments of the invention.

FIG. 3 depicts an exemplary window presented via a user interface (e.g., UI 505, described below with reference to FIG. 5) which a user may employ to specify whether all-user profiles, or all-user and per-user profiles, may be created on a particular device. Specifically, FIG. 3 includes window 310, which enables a user to specify whether network profiles created on a device are to be saved as all-user profiles (i.e., which the user specifies by clicking button 320) or as either all-user or per-user profiles (i.e., which the user selects by clicking button 330). The user may finalize the specification by clicking box 340, or cancel the selections by clicking box 350. Of course, numerous other types of input facilities could be employed to allow a user to specify whether all-user and/or per-user network profiles are to be created on a particular device, as the invention is not limited to a particular implementation.

Figure 4:
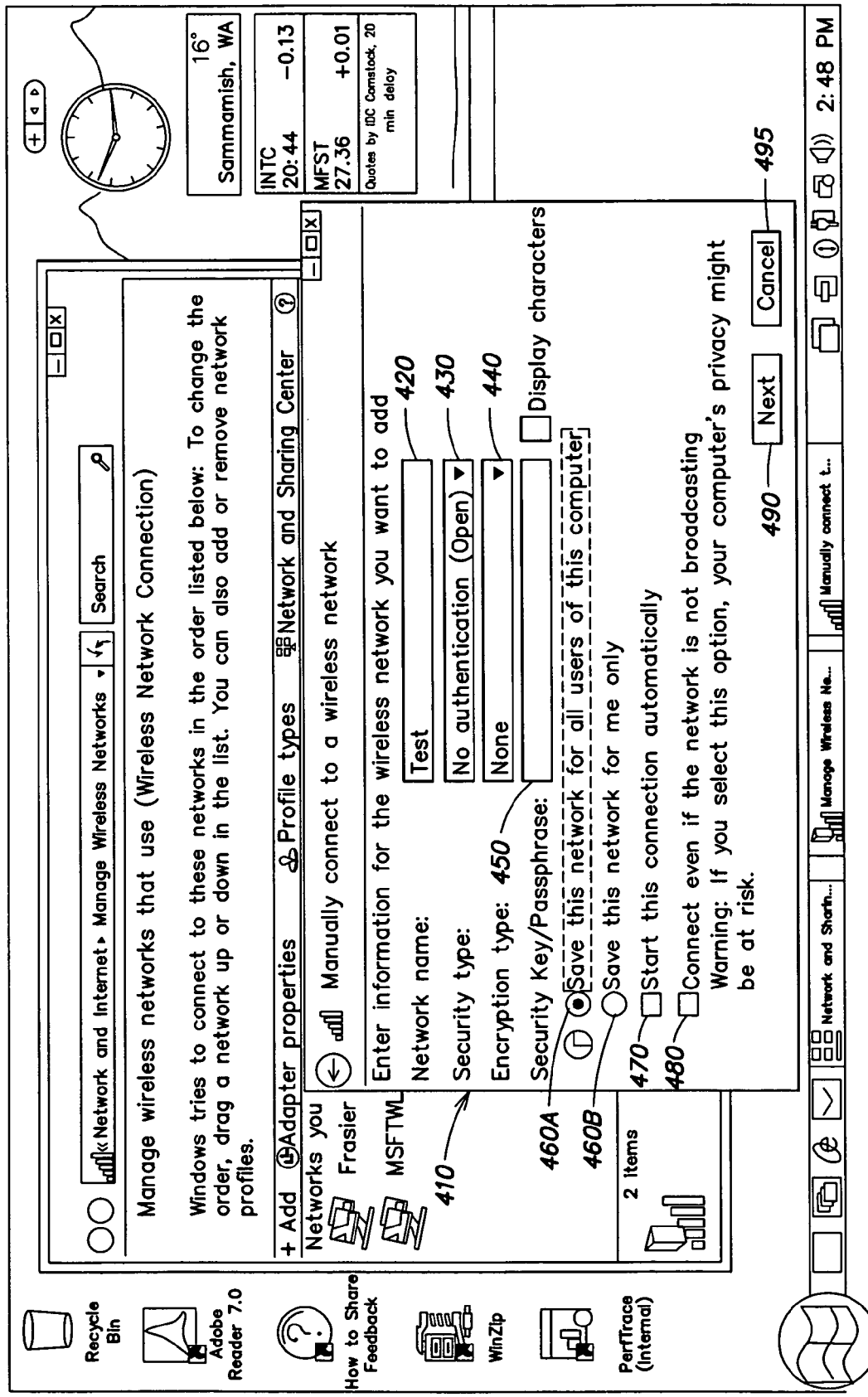
FIG. 4 is a representation of an exemplary user interface which a user may employ to create a wireless network profile, in accordance with embodiments of the invention.

FIG. 4 depicts an exemplary window presented via a user interface (e.g., UI 505, described below) for creating a network profile. Window 410 provides input facilities which allow the user to specify various configuration settings for the network profile. In the embodiment shown, box 420 allows the user to specify a name for the network profile, box 430 enables the specification of a security type to be employed when connecting to the network, box 440 enables the selection of an encryption type for data transport, and box 450 enables the user to specify a security key used to connect to the associated wireless network. Buttons 460A-460B enable the user to specify whether the network profile is an all-user profile ("for all users of this computer") or a per-user profile ("for me only"). Box 470 enables the user to specify whether to connect to the wireless network automatically, and box 480 enables the user to specify that a connection should be established even if the associated wireless network is not broadcasting. The user may apply these settings by selecting box 490, or cancel any of the above selections by clicking box 495. It should be appreciated that numerous other types of input facilities could be employed to allow a user to specify the characteristics of a network profile, as the invention is not limited in this respect.

It should also be appreciated that management of network profiles is not limited to being differentiated based on the identity of the user, as any one or more suitable differentiation criteria may be employed. For example, some embodiments of the invention enable differentiated management of network profiles based on the interface (e.g., a wireless network card in a device) that employs the profile for wireless connectivity. Any suitable criterion or criteria may be employed, as the invention is not limited to a particular implementation.

In some embodiments, management of network profiles which is differentiated based on interface enables the creation, management and use of network profiles that are usable by a single interface (a per-interface profile) or a group of interfaces (e.g., all network cards in a particular device)(an all-interface profile). For example, a per-interface profile may be employed for wireless connectivity by a particular interface, while an all-interface profile may be employed by a group of interfaces.

In accordance with some embodiments, all-interface and/or all-user profiles may be defined, managed and deployed via a centralized facility, such as is described in commonly assigned U.S. patent application entitled "Data Model And Data Operations For Centralized Deployment Of Wireless Clients," bearing U.S. Provisional Application Ser. No. 60/850,114, which is incorporated herein by reference. This application describes, among other features and capabilities, a schema for defining network profiles and a facility for distributing profiles to one or more devices for managing connectivity to wireless networks. In some embodiments, all-user, all-interface profiles may be implemented as "group policy" profiles and deployed via such a facility. In contrast, profiles which are all-user but per-interface (i.e. usable by all users employing a particular interface) or per-user and per-interface (i.e. usable by a particular user employing a certain interface) may be created and implemented as "local profiles" on specific devices.

In some embodiments, certain network profile attributes, such as whether a profile is per-user or all-user, or per-interface or all-interface, are defined when the considered network profile is created, and may, for example, remain fixed until the network profile is deleted. As such, certain characteristics of network profiles may not, in some embodiments, be changed "on-the-fly."

In accordance with some embodiments, a wireless management service maintains unique names for each network profile usable to manage wireless connectivity according to the scope, or use, of the profile (i.e. whether implemented on a per-user or all-user, and/or per-interface or all-interface, basis). For example, in some embodiments, the wireless management service ensures that group policy (i.e. all-user, all-interface) profile names are unique across all interfaces and all users. As such, when a group policy profile is added to a device, if a previous per-interface profile exists on the device with the same name, the per-interface profile is no longer used for wireless connectivity. In some embodiments, the per-interface profile is maintained on the device, albeit with a lower priority than the all-interface priority, and may be "shadowed" in a network profile list displayed to a user of the device. In some embodiments, if the group policy profile is later removed from the device, the per-interface profile may be employed again to manage connectivity to wireless networks.

In some embodiments, a wireless management service ensures that an all-user, per-interface profile has a name which is unique among profiles created for all users associated with the device. For example, in some embodiments, a wireless management service may prevent an all-user, per-interface profile from being added to a profile store maintained on a device if there is a group policy profile on the device with the same name, an all-user, per-interface profile with the same name, or a per-user, per-interface profile created by the same user with the same name.

In some embodiments, a wireless management service allows two per-user profiles with the same name to be associated with the same interface, as long as the per-user profiles are created by two different users. In some embodiments, a wireless management service may allow two all-user profiles with the same name to be associated with two different interfaces.

In some embodiments, a wireless management service maintains profile name uniqueness with respect to a user's view of profiles associated with an interface. For example, when a first user adds an all-user profile to an interface which does not have the same name as any of the per-interface profiles viewable by the first user, but does have the same name as a per-user profile created by a second user for the same device, the profile, in some embodiments, is not viewable by the first user.

To resolve name collisions between all-user and per-user profiles, a wireless management service implemented in accordance with some embodiments f the invention may comprise a profile manager component, which in some embodiments is implemented via software, which maintains a network profile list. The wireless management service may also include a user interface (UI) which a user may employ to view the network profile list. The profile manager may determine, for example, that if an all-user profile has the same name as a per-user profile, the all-user profile prevails, such that the UI will present the all-user profile to the user. In some embodiments, the per-user profile may be excluded (e.g., "shadowed") from the list presented to the user via the UI, while the all-user profile may be visible and usable. In some embodiments, if the all-user profile is later removed, the profile manager will employ the per-user profile again, and present the per-user profile in the network profile list via the UI. As such, the list of wireless network profiles accessible to a particular user may be refreshed every time an all-user profile is removed from the device.

Wireless Management Service Components

Figure 5:
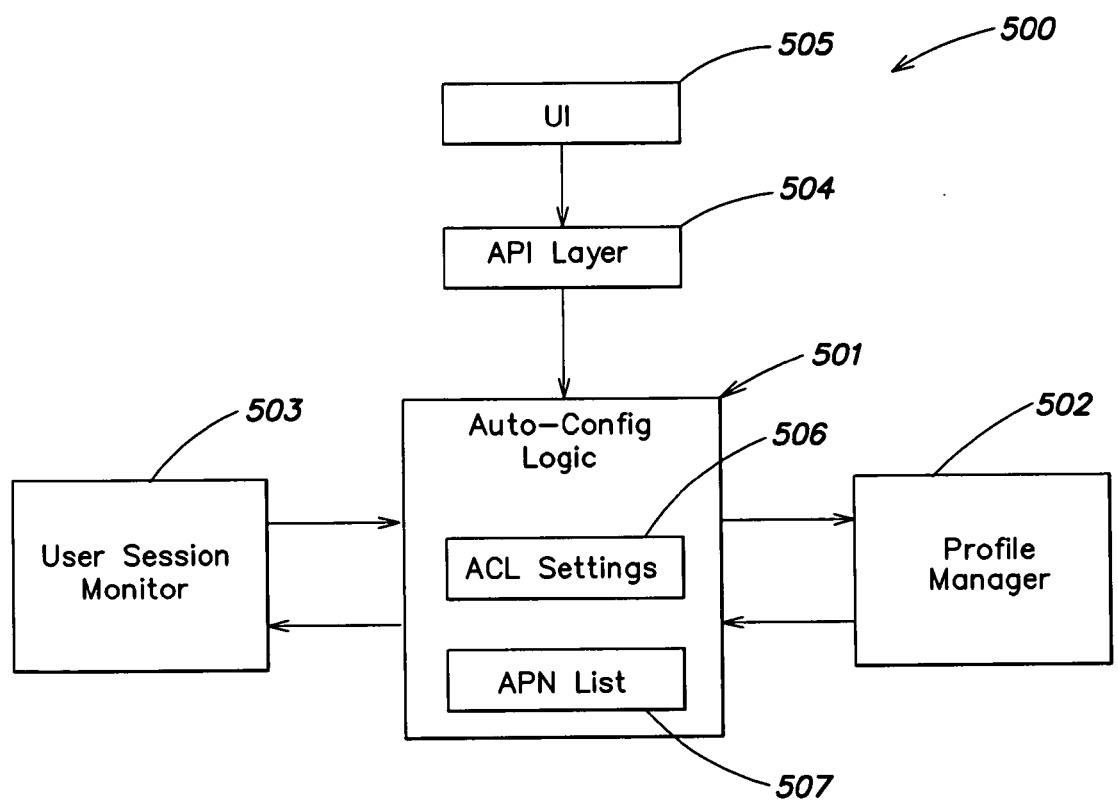
FIG. 5 is a block diagram depicting exemplary components of a wireless management service implemented in accordance with embodiments of the invention.

Aspects of embodiments of the invention may be implemented via software and data objects, such as in the form of the wireless management service depicted in FIG. 5. The depicted wireless management service comprises components including auto-config logic 501, profile manager 502, user session monitor 503, API layer 504, and UI 505. All of these depicted components may, in some embodiments, be implemented via programmed instructions and/or data objects which may be executable on a computing device, such as the device illustrated in FIG. 1, and may be stored on a computer-readable medium, such as the storage system depicted in FIG. 2.

In some embodiments, UI 505 presents various user interfaces which allow users to initiate wireless connectivity-related activities, such as creating and/or managing wireless network profiles, and connecting to and disconnecting from various wireless networks. Two exemplary windows which may be presented by UI 505 to allow users to specify various characteristics of wireless network profiles are described above with reference to FIGS. 3 and 4. Of course, other or different input facilities may be provided via UI 505, as the invention is not limited in this respect.

In the implementation shown, API layer 504 provides one or more application programming interfaces for applications (e.g., UI 505 and/or third-party applications executing on the device) to components in the operating system, such as to communicate connectivity-related requests to auto-config logic 501. In the implementation shown, auto-config logic 501 implements a portion of the business logic used to handle requests received from the API layer 504 to manage these connectivity-related requests. For example, auto-config logic 501 may implement business logic to determine whether a user who issues a connectivity-related request via UI 505 has appropriate privileges to perform the requested operation(s).

User session monitor 503 monitors the status of and changes to session types in progress on the device, including user log on/off, user session connections and/or disconnections, etc. In the implementation shown, user session monitor 503 tracks whether an active console session is ongoing on the device and its identifier, if applicable, so that connectivity-related requests may be handled appropriately, as described in further detail below.

Profile manager 502 manages and validates network profile information, including transferring information to and reading information from memory, if needed. In one embodiment, profile manager 502 manages the network profiles which are accessible by each user of a device, as described in further detail below.

Each of the wireless management service components depicted in FIG. 5 may perform processing related to handling connectivity-related requests, such as requests to connect to or disconnect from a wireless network, create a network profile, modify an existing network profile, or perform any other connectivity-related action. In some embodiments, when a user issues a connectivity-related request by providing input to UI 505, a call is issued by UI 505 to API layer 504, which retrieves information relating to the user's session from user session monitor 503. In some embodiments, this session information is passed to auto-config logic 501 with an indication of the action requested by the user. Auto-config logic 501 employs the user's session information to determine the user's credential information, as well as information on the current state and current active console session, from user session monitor 503. When user session monitor 503 provides this information, auto-config logic 501 employs the user's credentials, session, current state and active console session, as well as security information provided by ACL settings 506, to determine whether the user is authorized to perform the requested action.

In some embodiments, ACL settings 506 define information used by wireless management service to determine whether a user's requested action is authorized. In some embodiments, this information includes indications of network access privileges which are required to perform particular actions. For example, in some embodiments, a user's authorization to create or modify an all-user network profile is defined by whether the user possesses sufficient network access privileges, such as "Administrator" or "Network Configuration Operator" access privileges.

Table 1 illustrates exemplary settings that may comprise ACL Settings 506. Of course, not all of the exemplary settings shown in Table 1 are employed in all embodiments of the invention, and some embodiments may employ other and/or different settings. In Table 1, "Admin" and "Net Op" represents users having "Administrator" and "Network Configuration Operator" access privileges, respectively. "All" represents any user account, such that any logged-in user may perform the specified action.

TABLE 1

| Default Network Configuration Settings | Write | Read |
|---|---|---|
| Permit List | Admin/Net Op | All |
| Deny List | Admin/Net Op | All |
| Auto Config Enabled | Admin/Net Op | All |
| Background Scan | All | All |
| BSS Type | Admin/Net Op | All |
| Show Denied | All | All |
| Set Interfaces Calls | Admin/Net Op | All |
| IHV Control | Admin/Net Op | N/A |
| Add New All-User Profiles | All | N/A |
| Add New Per-User Profiles | All | N/A |

The interface described above with reference to FIG. 5 illustrates one way in which ACL settings 506 may be employed by embodiments of the invention within service 500. Specifically, FIG. 3 depicts an exemplary window which enables a user to specify whether only all-user profiles, or all-user and per-user profiles, are employed on a device. In some embodiments, if the considered user specifies that all-user profiles only are to be employed on a device, the "Add New All-User Profiles" setting in ACL settings 506 is set as "All," and any newly created all-user profile may be modified, renamed or deleted by all users. By contrast, if the user specifies that both per-user and all-user profiles may be employed, the "Add New All-User Profiles" setting in ACL settings 506 may be set as "Admin/Net Op," such that any newly created all-user profile may only be modified, renamed or deleted by an administrator or network configuration operator.

Management Of Wireless Connectivity a. Anchoring Preferred Network List

In some embodiments, profile manager 502, shown in FIG. 5, maintains the network profiles which are associated with and employed by an interface in a collection called an associated profile list. However, in some embodiments, not all profiles in the associated profile list are accessible to each user of the device. This is because, in some embodiments, a per-user profile is accessible only by the user who created it (e.g., ACL settings 506 may specify that only that user may access or modify the per-user profile). In some embodiments, profile manager 502 maintains a list of profiles which are accessible to each user in a collection called a user-accessible profile list. In some embodiments, the user-accessible profile list consists of: (1) group policy profiles employed by the interface; (2) all-user, per-interface profiles associated with the interface; and (3) per-user, per-interface profiles associated with the interface and created by the considered user.

In some embodiments, the user-accessible profile list may be employed to automatically connect the interface to particular wireless networks, such as when a user logs on to the interface. For example, in some embodiments this list may be employed to implement auto-connect/auto-switch logic, via an anchoring preferred network list 507 which is defined by auto-config logic 501 using information maintained by profile manager 502.

In some embodiments, an "anchoring preferred network list" defines the wireless networks to which a user of a device may connect, either automatically or manually. In some embodiments, the anchoring preferred network list is defined based on not only the user-accessible profile list maintained by profile manager 502, but also on the session type employed by the user at the time connection is to occur.

Figure 11:
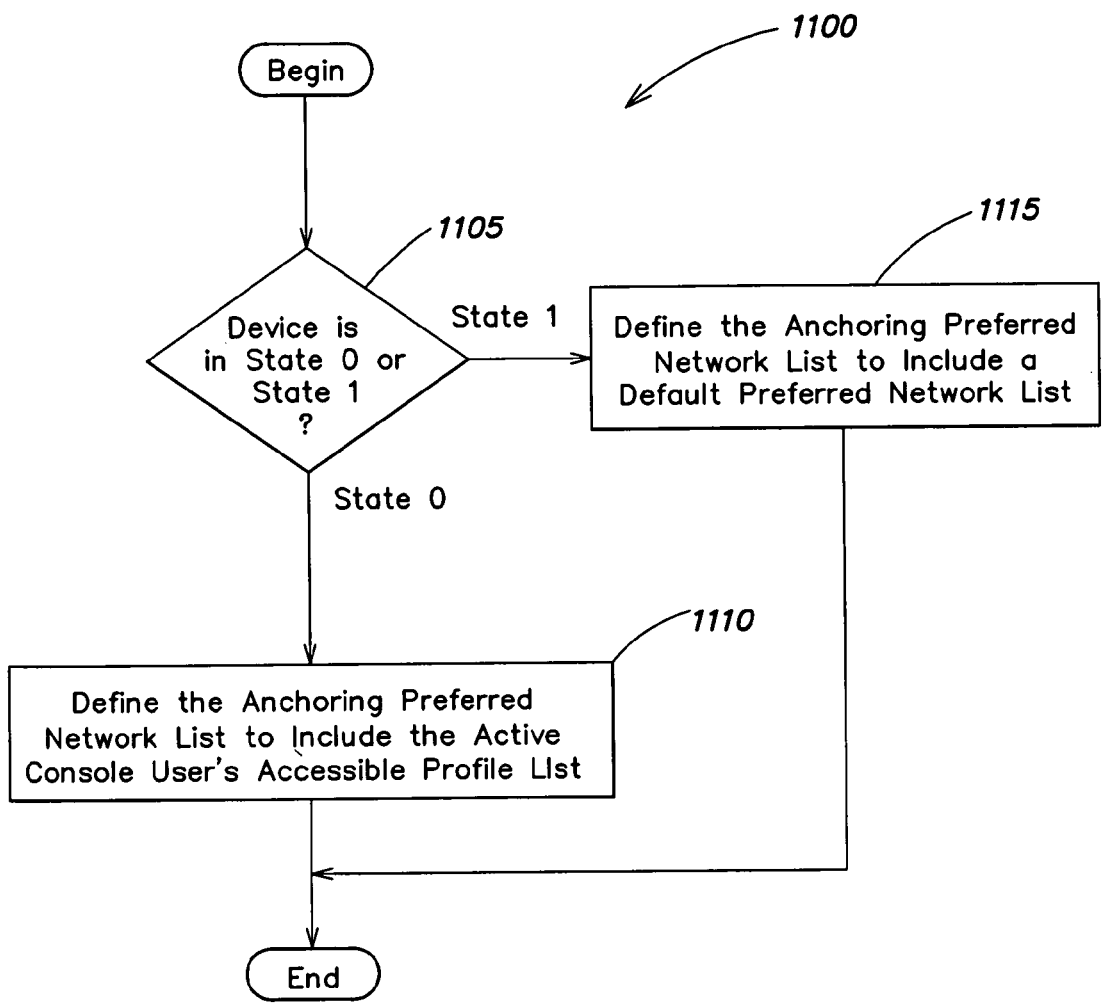
FIG. 11 is a flowchart depicting an exemplary process which may be performed to determine the network profiles visible in an anchoring preferred network list, in accordance with embodiments of the invention.

FIG. 11 depicts an exemplary process 1100 for defining the anchoring preferred network list on a device. At the start of the process, a determination is made in act 1105 whether the device resides in a first state (referred to herein as "state 0," which occurs when at least one active console user is logged on to the device) or a second state (referred to herein as "state 1," which occurs when no active console user is logged in). If it is determined in act 1105 that the device resides in the first state (i.e. state 0), the process proceeds to act 1110, wherein the anchoring preferred network list is defined to include the active console user's accessible profile list, which in some embodiments includes group policy profiles, all-user interface profiles, and the per-user interface profiles of the active console user. However, if it determined in act 1105 that the device resides in the second state (i.e. state 1), the process proceeds to act 1115, wherein the anchoring-preferred network list is defined to include a default preferred network list, which in some embodiments includes group policy profiles and all-user interface profiles, but not per-user interface profiles (as no active console user is logged in). Upon the completion of either of acts 1110 or 1115, process 1100 completes.

Figure 6:
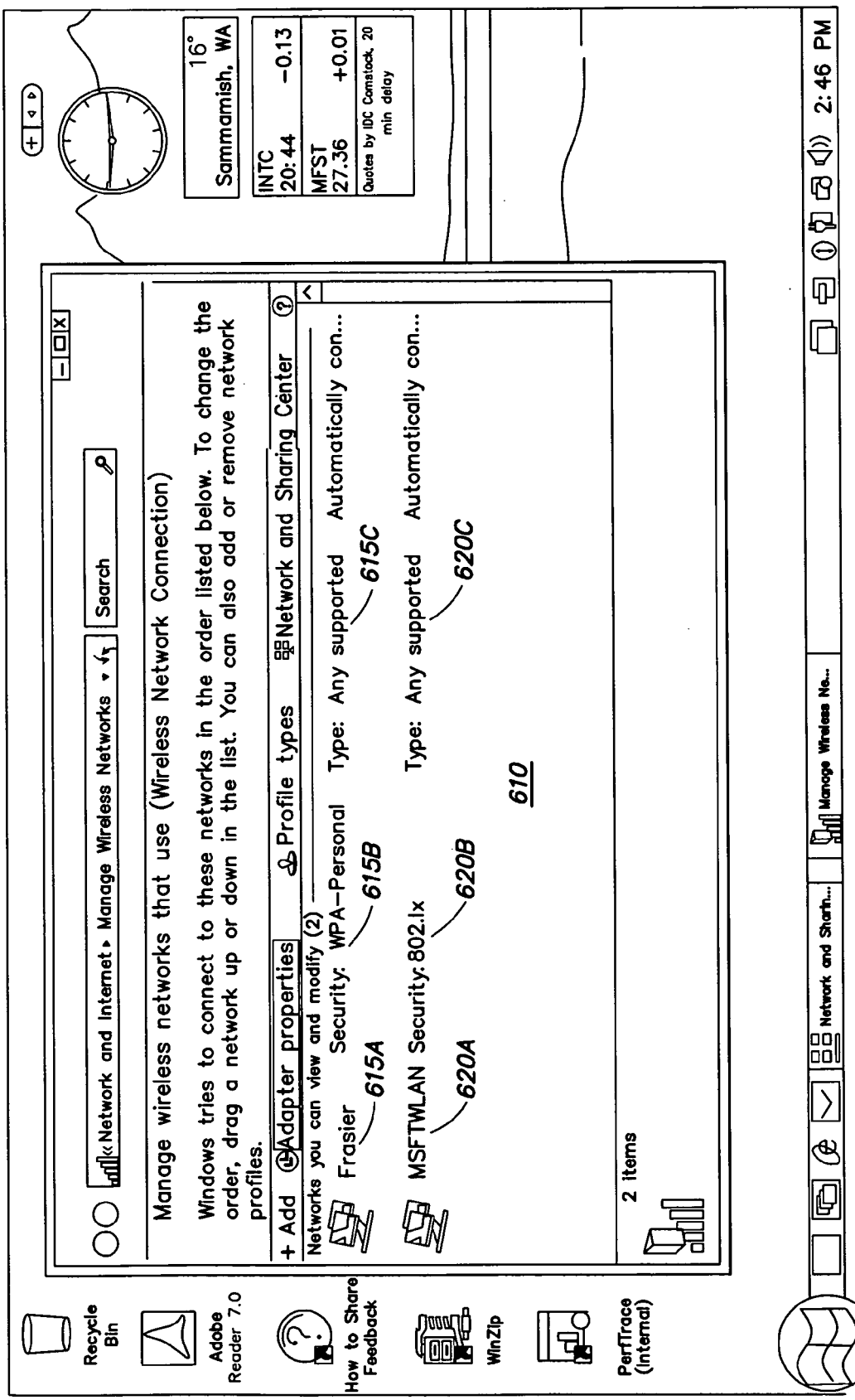
FIG. 6 is a representation of an exemplary user interface which a user may employ to view a list of preferred wireless networks, in accordance with embodiments of the invention.

An exemplary window presented via UI 505 which may be employed by a user to manage the anchoring preferred network list is shown in FIG. 6. Specifically, window 610 displays icons 615A and 620A, representing profiles for two wireless networks named "Frasier" and "MSFTWLAN," respectively. Properties are also shown for each profile, including security type (615B-620B) and radio type (615C-620C). UI 505 may, in some embodiments, provide an input facility allowing a user to specify that a connection to one or more networks should be initiated automatically, such as when the user logs on to the device. For example, window 410 (FIG. 4) provides box 470, which allows the user to specify that a connection to the considered wireless network should be started automatically. UI 505 may also, or alternatively, provide an input facility which allows a user to initiate a connection to a wireless network manually, as described below.

b. User-Initiated Connections To Wireless Networks

Figure 7A:
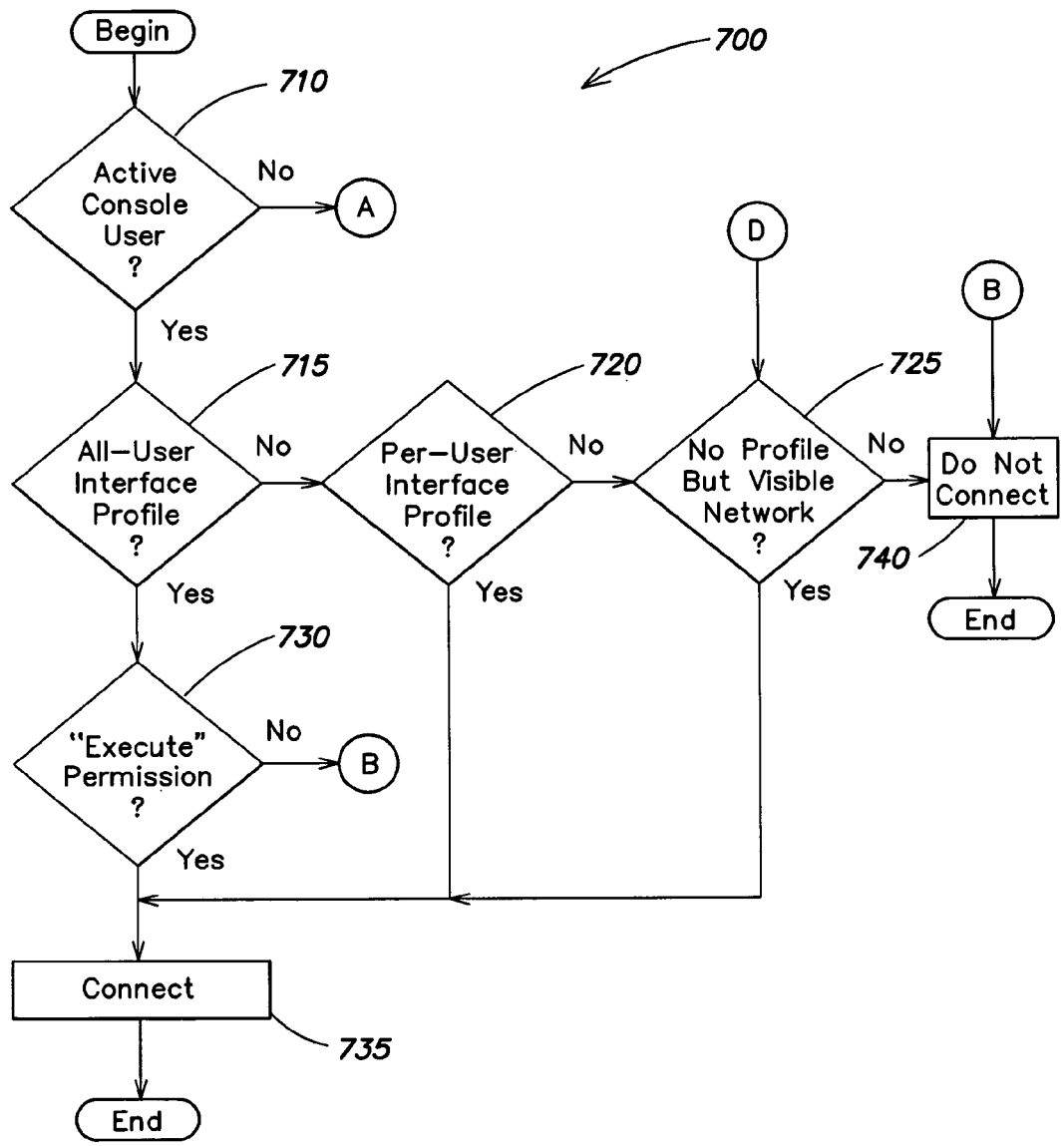
FIGS. 7A and 7B are flowcharts depicting an exemplary process which may be performed by a wireless service in response to a user's request to connect to a wireless network, in accordance with embodiments of the invention.
Figure 7B:
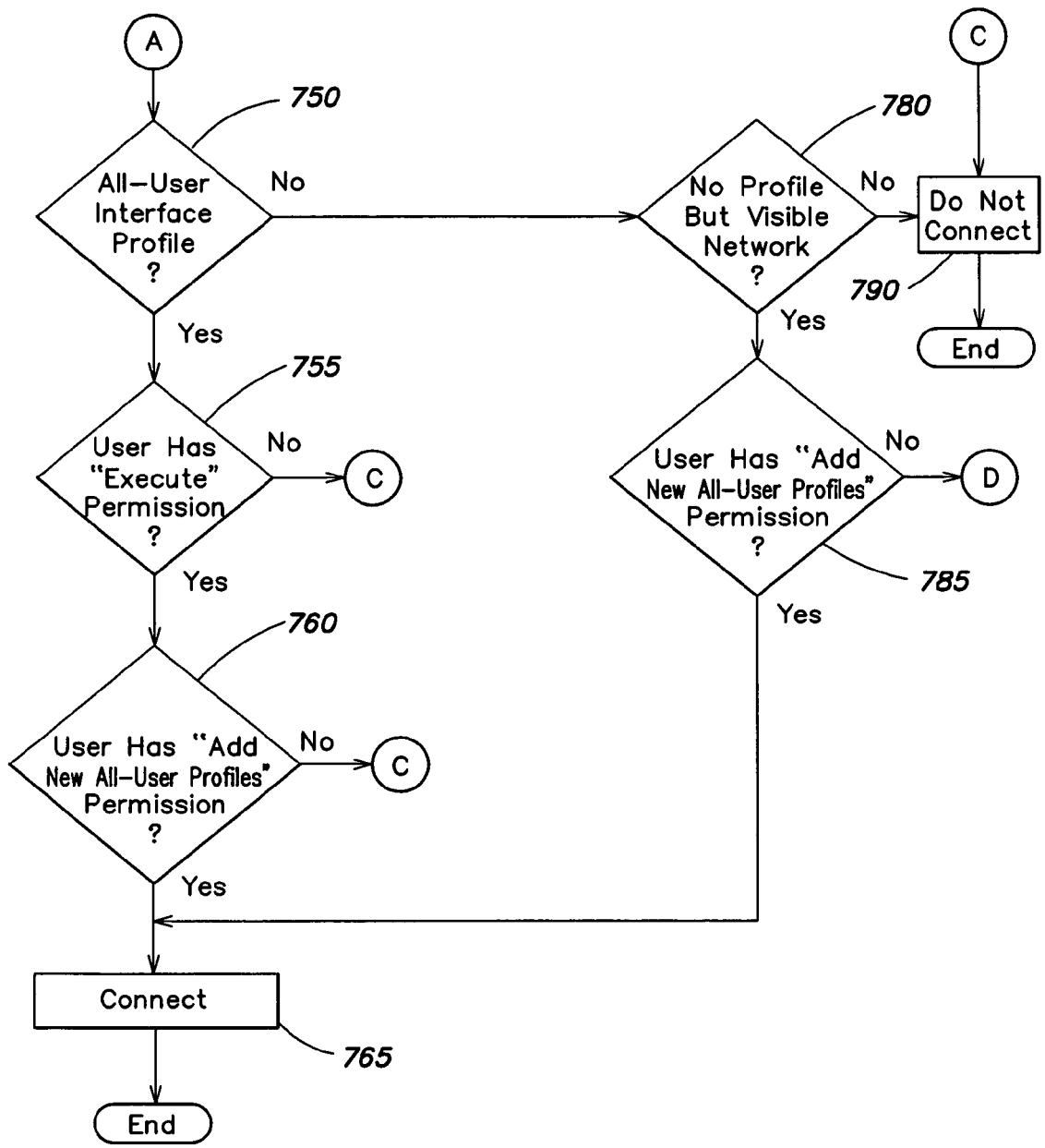

In some embodiments, UI 505 of service 500 provides a facility which enables a user of an interface to connect to "visible" networks in the anchoring preferred network list. In some embodiments, authorization to connect to visible networks is defined by the session type and the type of profile used by the interface. An exemplary process 700 for determining whether a user is allowed to connect to a network in the anchoring preferred network list is shown in FIGS. 7A-7B.

At the beginning of process 700, a determination is made in act 710 as to whether an active console user is logged in (i.e., the interface is in state 0). If so, the process proceeds to act 715, wherein it is determined whether the network is represented by an all-user interface profile. If so, the process proceeds to act 730, wherein it is determined whether the user has "execute" permission as defined by the all-user interface profile to connect to the network. If so, the process proceeds to act 735, wherein a connection to the network is established, and process 700 completes.

If it is determined in act 715 that the network is not represented by an all-user interface profile, the process proceeds to act 720, wherein it is determined whether the network is represented by a per-user interface profile. If so, the process proceeds to act 735, wherein a connection to the network is established, and process 700 completes. If not, the process proceeds to act 725, wherein a determination is made whether the network is a non-profiled visible network. If so, the process proceeds to act 735, wherein a connection is established, and process 700 completes. If not, the process proceeds to act 740, wherein the request to connect to the visible network is refused (i.e., a connection is not established), and process 700 ends.

If it is determined in act 710 that no active console user is logged in (i.e., the interface is in state 1), process 700 proceeds to act 750 (FIG. 7B), wherein it is determined whether the network is represented by an all-user interface profile. If so, the process proceeds to act 755, wherein it is determined whether the user has "execute" permission, as defined by the profile, to connect to the network. If so, the process proceeds to act 760, wherein it is determined whether the user has permission to "add new all-user profiles." If so, the process proceeds to act 765, wherein a connection to the wireless network is established, and process 700 completes.

Figure 10:
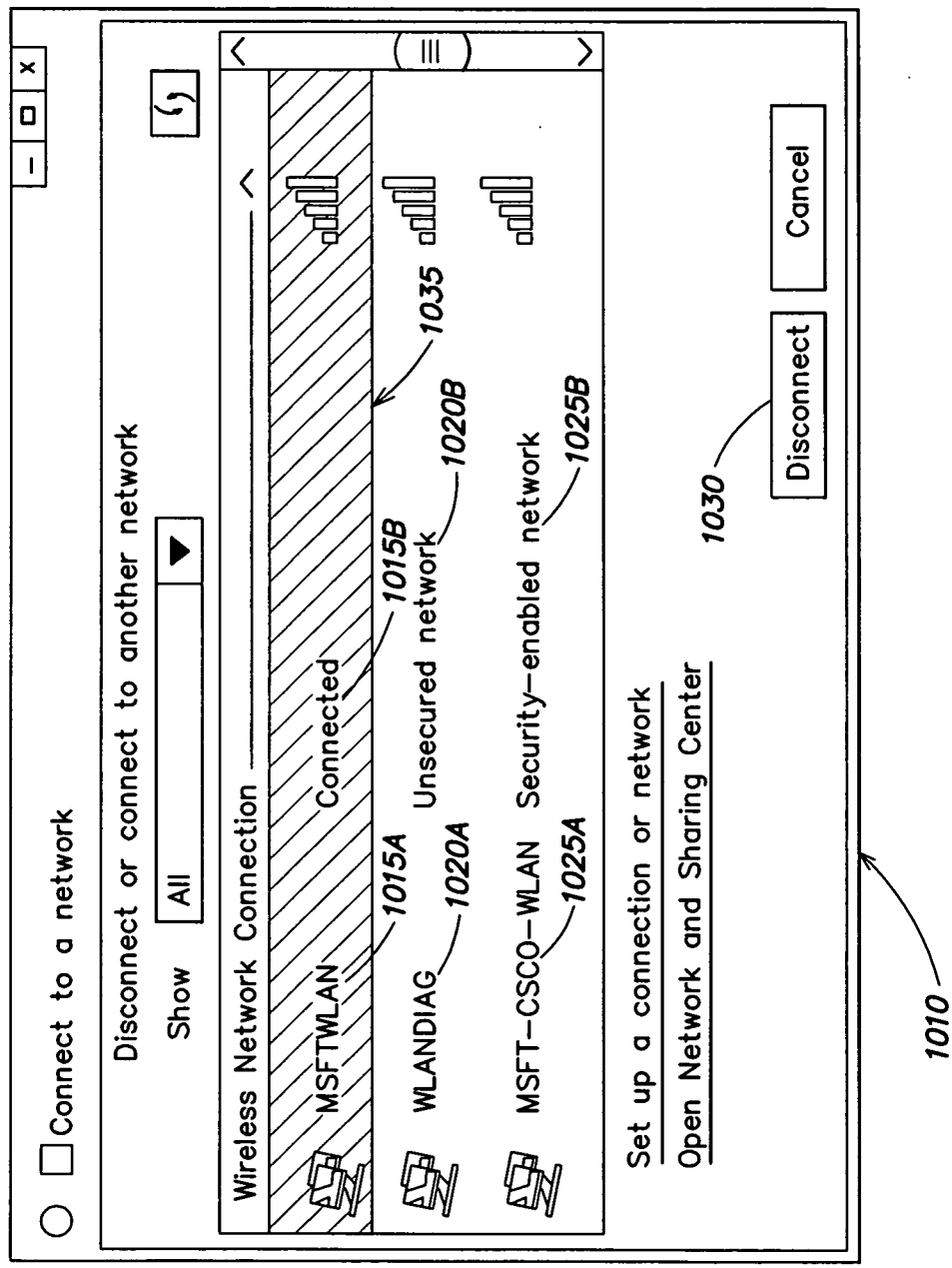
FIG. 10 is a representation of an exemplary user interface which may be employed to view a list of visible networks, in accordance with embodiments of the invention.

If it is determined at act 750 that the network is not represented by an all-user interface profile, the process proceeds to act 780, wherein it is determined whether the network is non-profiled but visible. A wireless network may be non-profiled but visible, for example, because it was identified through an automated discovery of SSIDs (i.e., network identifiers) in wireless range of the device. In this respect, any wireless network may broadcast an SSID, and devices may discover networks broadcasting an SSID. Discovery may result in the presentation of a list of visible (i.e. discovered) networks, such as via UI 505. In some embodiments, the list is presented in a way that allows the user to select a network from the list to which the user wishes to connect. An exemplary window 1010 which may be presented by UI 505 to enable connection to, and/or disconnection from, discovered networks is shown in FIG. 10. Window 1010 includes network representations 101 SA, 1020A and 1025A, which have respective status indicators 1015B, 1020B and 1025B. Because status indicator 1015B shows that the user is "Connected" to the selected network (shown by highlighting 1035) symbolized by representation 1015A, button 1030 allows the user to connect. Alternatively, if a network had been selected to which the user was not connected, button 1030 might allow the user to connect to the network. After connecting to a network, the user may save a profile for the network.

If it is determined in act 780 that the network is non-profiled but visible, the process proceeds to act 785, wherein it is determined whether the user has permission to "add new all-user profiles." If so, the process proceeds to act 765, wherein a connection to the wireless network is established, and process 700 completes. If not, the process proceeds to act 725, and process 700 proceeds as described above.

If it is determined in act 780 that the network is not a non-profiled but visible network, the process proceeds to act 790, wherein the request to connect to the wireless network is refused, and process 700 completes.

c. User-Initiated Disconnections From A Wireless Network

Figure 8A:
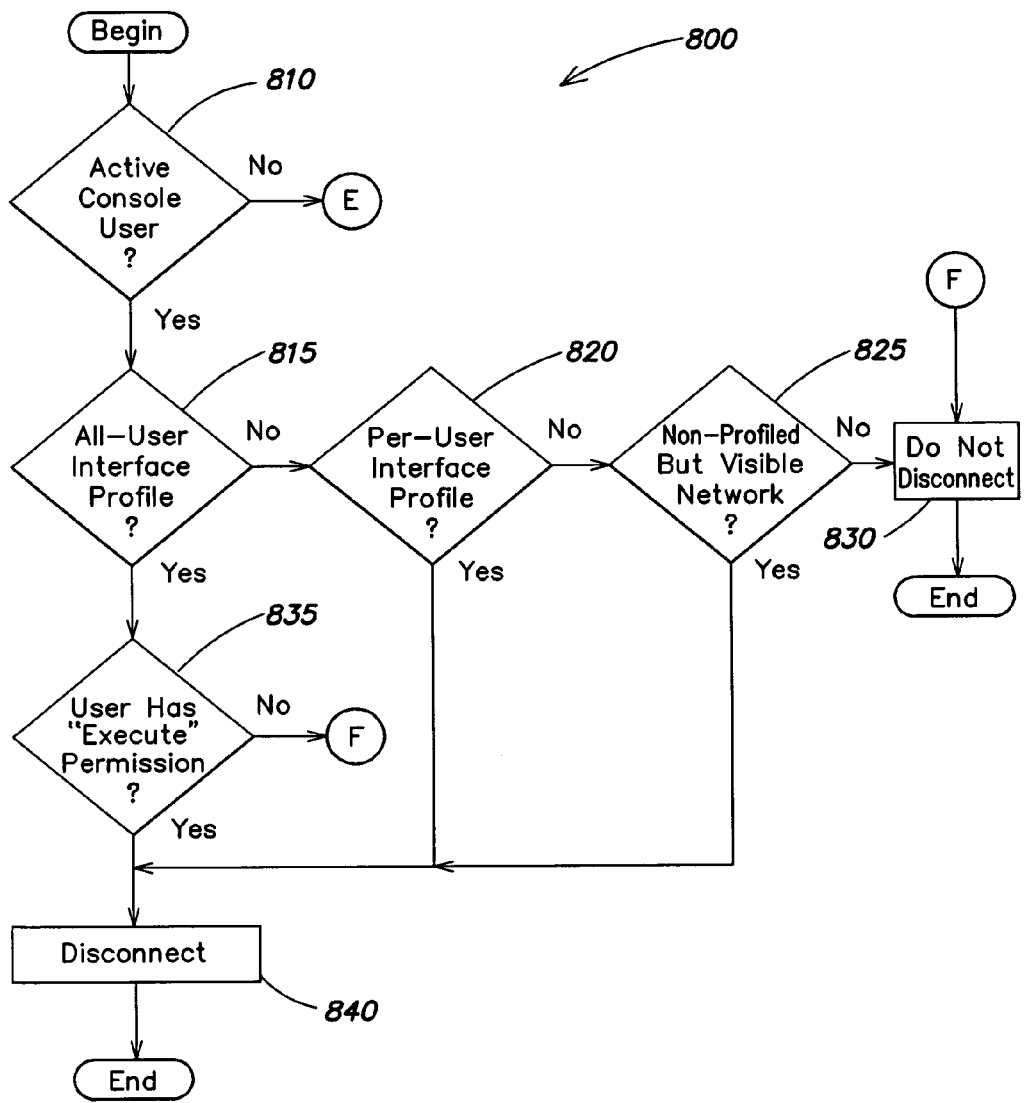
FIGS. 8A and 8B are flowcharts depicting an exemplary process which may be performed by a wireless service in response to a user's request to disconnect from a wireless network, in accordance with embodiments of the invention.
Figure 8B:
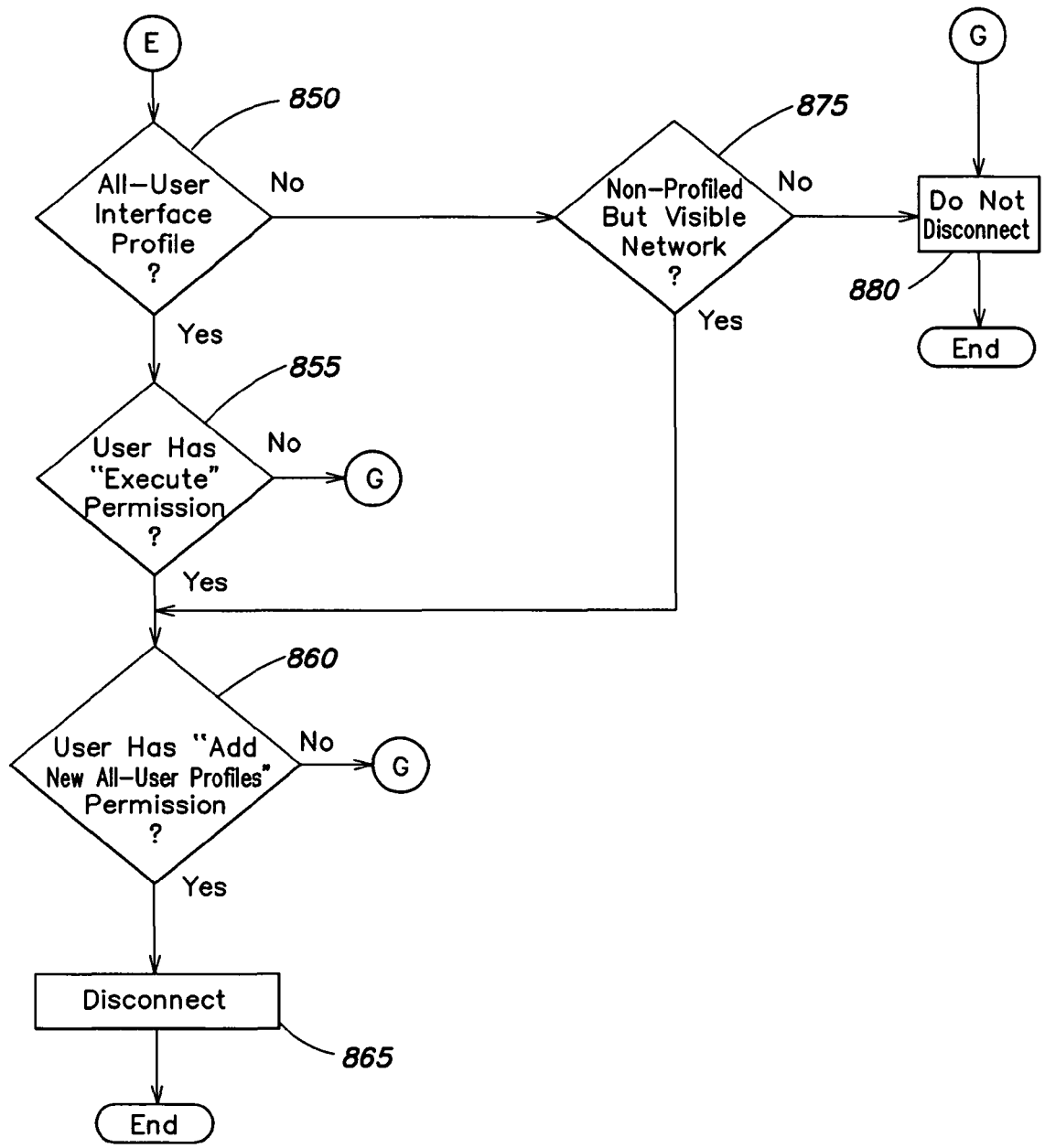

FIGS. 8A-8B depict an exemplary process 800 which may be executed when a user initiates a disconnection from a particular wireless network.

At the start of process 800 (FIG. 8A), in act 810 it is determined whether there is an active console user on the device (i.e., whether the device is in state 0). If so, the process proceeds to act 815, wherein it is determined whether the wireless network is represented by an all-user interface profile. If so, the process proceeds to act 835, wherein it is determined whether the considered user has "execute" permission, as defined by the profile. If so, the process proceeds to act 840, wherein the request to disconnect from the network is granted, and the connection to the network is severed. Process 800 then completes.

If it is determined in act 815 that the network is not represented by an all-user interface profile, the process proceeds to act 820, wherein it is determined whether the network is represented by a per-user interface profile. If so, the process proceeds to act 840, wherein the request to disconnect from the network is granted. Process 800 then completes.

If it is determined in act 820 that the network is not represented by a per-user interface profile, the process proceeds to act 825, wherein it is determined whether the network is a non-profiled but visible network. If so, the process proceeds to act 840, wherein the request to disconnect from the network is granted. Process 800 then completes.

If it is determined in act 825 that the network is not a non-profiled visible network, the process proceeds to act 830, wherein the request to disconnect from the network is refused. Process 800 then ends.

If it is determined in act 835 that the user does not have "execute" permission, then the process proceeds to act 830, and the request to disconnect from the network is refused. The process then ends.

If it is determined in act 810 that there is not an active console user on the device, the process proceeds to act 850 (FIG. 8B), wherein it is determined whether the network is represented by an all-user interface profile. If so, the process proceeds to act 855, wherein it is determined whether the user has "execute" permission. If so, the process proceeds to act 860, wherein it is determined whether the user has "add new all-user profile" permission. If so, the process proceeds to act 865, wherein the request to disconnect from the network is granted, and the connection to the network is severed.

If it is determined in act 850 that the network is not represented by an all-user interface profile, the process proceeds to act 875, wherein it is determined whether the network is a non-profiled visible network. If so, the process proceeds to act 860 and proceeds as described above. If not, the process proceeds to act 880, wherein the request to disconnect from the network is refused. Process 800 then completes.

If it is determined in act 855 that the user does not have "execute" permission, or in act 860 that the user does not have "add new all-user profiles" permission, the process proceeds to act 880, wherein the request to disconnect from the network is refused.

d. Session-Based Connection Management

As discussed above, some embodiments of the present invention provide the capability to manage the handling of connectivity events on a device in a manner which is influenced by the session type(s) ongoing on the device when a connectivity event is initiated. For example, when multiple users employ the same device in overlapping timeframes (e.g., when a terminal services user and an active console user employ a device simultaneously), some embodiments of the invention enable connectivity events (e.g., connections or disconnections from a wireless network) to be handled in a manner that ensures that connectivity is not lost, for example, by one user (e.g., an active console user) when another user (e.g., a terminal services user) initiates a connectivity event.

In some embodiments, when an active console user is logged on to a device, the anchoring-preferred network list consists of group policy profiles, all-user interface profiles, and the active console user's per-user interface profiles. In some embodiments, the active console user may view the anchoring preferred network list via UI 505 (e.g., via window 1010, depicted in FIG. 10). By contrast, in some embodiments, terminal service and non-active console users may only be able to view all-user interface profiles and non-profiled visible networks, as well as any networks to which the device is currently connected (which may be represented in be the active console user's per-user interface profile) via UI 505 (e.g., window 1010). That is, terminal service users and non-active console users may not, in some embodiments, be able to view their per-user interface profiles via UI 505.

In some embodiments, when the device shifts from one state to another, such as when an active console user becomes inactive by logging off the device, connections to networks in the active console user's per-user profiles are automatically severed, and the active console user's per-user profiles are removed from the anchoring-preferred network list 507 maintained by auto-config logic 501 (FIG. 5). This may have several implications with respect to the profile list maintained by profile manager 502, and may affect how a list of available networks is presented to other users via UI 505. For example, in some embodiments, when an active console user logs off a device, the anchoring preferred network list is updated to include only group policy profiles and all-user interface profiles. Thus, in some embodiments, when an active console user logs off, other users (e.g., terminal service and non-active console users) may only be able to view all-user interface profiles and non-profiled visible networks.

In some embodiments, if an active console user, before logging off, is connected to a per-user profile, a non-active console user may view the profile name (e.g., network representation 1015A, FIG. 10) and see that the active console user is connected (e.g., via status indicator 1015B). However, in some embodiments, when the active console user logs off, non-active console users can no longer see the connected per-user profile of the active console user, because the active console user's connection gets disconnected when the active console user logs off. Of course, the invention is not limited to the above-described implementation. For example, embodiments of the invention may not allow others user to view an active console user's per-user profile at all, such that there is no change to the display when an active console user logs off.

An active console user's log-off may also affect other users of the device in that it could trigger a connection to one or more wireless networks. As a result, embodiments of the invention provide logic for handling a connection to a wireless network brought on by a change to the state of the device. For example, in some embodiments, it is first determined whether an active console session is ongoing on the device. If so, the active console user's per-user profiles as well as the all-user profiles that are indicated as "auto connect" (e.g., via box 470 presented by window 410, FIG. 4) are used to build the anchoring preferred network list. If not, only the all-user profiles that are indicated as "auto connect" are used to build the anchoring preferred network list. Of course, the invention is not limited to such an implementation.

Figure 9:
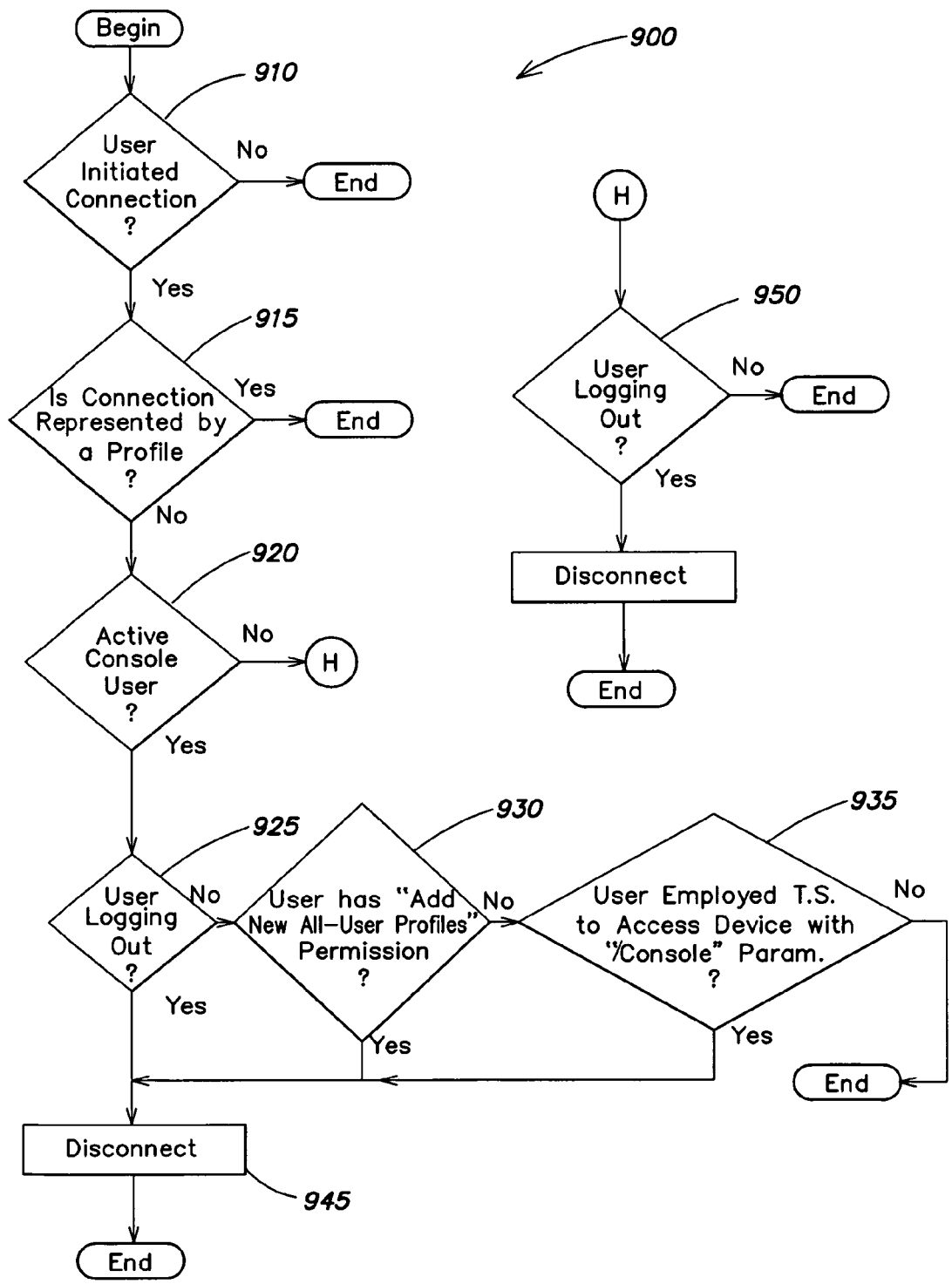
FIG. 9 is a flowchart depicting an exemplary process which may be performed by a wireless service in response to a change in session type, in accordance with embodiments of the invention.

FIG. 9 depicts an exemplary process 900 which may be performed (e.g., by wireless management service 500, FIG. 5) to manage connectivity to a wireless network in response to a user's initiation of a change to the session type.

At the start of process 900, in act 910, a determination is made whether the user initiated the connection to the wireless network. If not, the process completes. If so, the process proceeds to act 915, wherein it is determined whether the connection to the wireless network is represented by a network profile. If so, the process ends. If not, the process proceeds to act 920, wherein it is determined whether the user is an active console user. If so, the process proceeds to act 925, wherein it is determined whether the user is logging out. If so, the connection to the wireless network is disconnected in act 945, and the process completes.

If not, the process proceeds to act 930, wherein it is determined whether the user has permission to add new all-user profiles. If so, the connection to the wireless network is disconnected, and the process completes. If not, the process proceeds to act 935, wherein it is determined whether the user employed a terminal service to access the interface with a "/console" parameter. If so, the connection to the wireless network is disconnected, and the process completes. If not, the process completes.

If it is determined in act 920 that the user is not an active console user, the process proceeds to act 950, wherein it is determined whether the user is logging out. If not, the process completes. If so, the connection to the wireless network is disconnected, and the process completes.

Having described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for managing wireless connectivity on a single computing device comprising a multi-user operating system that provides user accounts for a plurality of users on the device, the method performed by the operating system and comprising acts of:
   (A) defining, via a service executing on the device used to manage connectivity between the device and any of a plurality of wireless networks, the service configuring a network profile stored on the device for each one of the plurality of wireless networks, one or more network profiles each usable to initiate a connection between the device and one of the plurality of wireless networks, the network profiles including per-user network profiles that are created and owned by respective of the users and all-user network profiles;
   (B) receiving, by the service, a request from the first user of the device to view the one or more wireless networks to which a connection by the device is allowed;
   (C) responsive to the receiving, determining whether the first user is an active console user who is logged on to the device or a non-active console user who employs a terminal service to access the device;
   (D) based on the determining, if it is determined in the act (C) that the first user is an active console user who is logged on to the device, then if available presenting an all-user network profile applicable to an available wireless network and otherwise presenting a per-user network profile that corresponds to the first user, and if it is determined in the act (C) that the first user is a non-active console user who employs a terminal service to access the device, then if available, presenting an all-user network profile applicable to the available wireless network and otherwise connecting to the available wireless network if determined that the first user has permission, wherein if an all-user network profile is available, wherein if the first user is an active console user who logs on to the device and an all-user network profile is available then a per-user profile owned by the first user is excluded from being presented.

2. The method of claim 1, wherein the act (D) further comprises, if it is determined in the act (C) that the first user is an active console user who logs on to the device, presenting one or more network profiles that are accessible to all of the users of the device.

3. The method of claim 1, wherein the system further comprises a plurality of devices, the act (A) further comprises defining a group of all-interface network profiles which are accessible by each user of each of the plurality of devices, and the act (D) further comprises presenting the group of all-interface network profiles to the first user.

4. The method of claim 1, wherein the system further comprises a graphical user interface executing on the device and in communication with the service, and wherein the act (D) further comprises, if it is determined in the act (C) that the first user is an active console user who logs on to the device, presenting to the first user one or more network profiles that are accessible only to the first user via the graphical user interface.

5. At least one storage device having encoded thereon instructions which, when executed, cause a device to perform a method for managing wireless connectivity of the device, the device comprising a computer with an operating system configured to be shared by a plurality of users having respective user accounts on the computer, the method comprising acts of:
   (A) receiving a request via a service executing on the device, the service used to manage connectivity between the device and any of a plurality of wireless networks, the service configuring a plurality of network profiles each usable to initiate a connection between the device and one of the plurality of wireless networks, the request received from a first user of the device to initiate an action related to connectivity between the device and at least one of the plurality of wireless networks, the network profiles including all-user network profiles that are applicable to all users of the device and including per-user network profiles that according to the operating system are owned by respective of the users;
   (B) determining whether the first user is an active console user who is logged on to the device or a non-active console user who employs a terminal service to access the device;
   (C) when it is determined in the act (B) that the first user is an active console user who is logged on to the device, then responding to the request received in the act (A) by presenting a first subset of the plurality of network profiles to the first user, based on the first user having been determined to be an active console user who logs on to the device, the first subset formed by determining if any all-user network profiles are applicable to an available wireless network and if not including in the first subset, if available, a user-specific network profile owned and controlled by the first user; and
   (D) when it is determined in the act (B) that the first user is a non-active console user who employs a terminal service to access the device, then responding to the request received in the act (A) by presenting a second subset of the plurality of network profiles to the first user, the second subset formed by determining if any all-user network profiles are applicable to an available wireless network and if not then determining if the first user has a privilege for adding network profiles and if the first user has the privilege then connecting to the available wireless network.

6. The at least one storage device of claim 5, wherein:
   the service configures a network profile to represent each of the at least one wireless networks and defines a group of all-user network profiles that are accessible by each user of the device and a group of per-user network profiles that are accessible by only the first user of the device;

the request received in the act (A) to initiate an action related to connectivity comprises a request to connect to the at least one wireless network; and responding to the request in the act (C) comprises establishing connectivity to the at least one wireless network if the at least one wireless network is represented by an all-user network profile and the first user has permission to execute the all-user network profile, or if the at least one wireless network is represented by a per-user network profile, or if the at least one wireless network is not represented by a network profile but is visible to the first user.

7. The at least one storage device of claim 5, wherein:

the service configures a network profile to represent each of the at least one wireless networks and defines a group of all-user network profiles that are accessible by each user of the device and a group of per-user network profiles that are accessible by only the first user of the device;

the request received in the act (A) to initiate an action related to connectivity comprises a request to connect to the at least one wireless network; and responding to the request in the act (D) comprises establishing connectivity to the at least one wireless network if the at least one wireless network is represented by an all-user network profile and the first user has permission to execute the all-user network profile and the first user has permission to create new all-user profiles, or if the at least one wireless network is not represented by a network profile but is visible to the first user and the first user has permission to create new all-user profiles.

8. The at least one storage device of claim 5, wherein:

the service configures a network profile to represent each of the at least one wireless networks and defines a group of all-user network profiles that are accessible by each user of the device and a group of per-user network profiles that are accessible by only the first user of the device;

the request received in the act (A) to initiate an action related to connectivity comprises a request to disconnect from the at least one wireless network; and responding to the request in the act (C) comprises severing connectivity to the at least one wireless network if the at least one wireless network is represented by an all-user network profile and the first user has permission to execute the all-user network profile, or if the at least one wireless network is represented by a per-user network profile, or if the at least one wireless network is not represented by a network profile but is visible to the first user.

9. The at least one storage device of claim 5, wherein:

the service configures a network profile to represent each of the at least one wireless networks and to define a group of all-user network profiles that are accessible by each user of the device and a group of per-user network profiles that are accessible by only the first user of the device;

the request received in the act (A) to initiate an action related to connectivity comprises a request to disconnect from the at least one wireless network; and responding to the request in the act (D) comprises severing connectivity to the at least one wireless network if the at least one wireless network is represented by an all-user network profile, the first user has permission to execute the all-user network profile and the first user has permission to create new all-user profiles, or if the at least one wireless network is represented by a per-user network profile and the first user has permission to create new all-user profiles, or if the at least one wireless network is not represented by a network profile but is visible to the first user and the first user has permission to create new all-user profiles.

10. A method of managing network profiles on a computing device, each network profile comprising a respective configuration setting for a corresponding network, the computing device comprising a wireless network interface and an operating system providing multiple user accounts for respective users, the user accounts able to use the wireless network interface, the method performed by the operating system and comprising:

enabling the users, via the respective user accounts, to generate and edit the network profiles, each network profile comprising an object stored and managed by the operating system, wherein when an arbitrary user generates a new network profile the profile comprises, according to input from the arbitrary user, either an all-user profile or a per-user profile, wherein all-user profiles are applicable to all of the user accounts and per-user profiles are applicable to a corresponding one of the user accounts;

when the computing device is to connect with a wireless network, selecting a set of network profiles by first determining whether there are any all-user network profiles that are applicable to the wireless network and second, if the first determining indicates that there are not any all-user network profiles that are applicable to the wireless network, then determining whether there are any per-user network profiles that are applicable to the wireless network, wherein the selecting of the network profiles is informed by a determination of whether a user of the computing device has logged in through a remote login service or with a console login session, wherein which network profiles are selected depends at least in part on the determination of whether the user has logged in through the remote login service or through the local console login, and wherein the selecting is further performed such that the all-user network profile is only selected when the user has permission for the all-user network profile; and forming a preferred network list from the set of network profiles and using the preferred network list to automatically connect the wireless network interface with the wireless network.

11. A method according to claim 10, further comprising determining, according to the credential of the user account of the user, whether the user has execute permission for a per-user network profile and only selecting the per-user network profile for the set of network profiles when the user has execute permission for the per-user network profile.

12. A method according to claim 10, use of the network profiles by the users is regulated by respective access control lists administered by the operating system.

13. A method according to claim 10, further comprising determining, according to a credential of the user account of the user, whether the user has permission for an all-user network profile and only selecting the all-user network profile for the set of network profiles when the user has execute permission for the all-user network profile.

14. A method according to claim 10, wherein at least some of the network profiles are for different respective networks.

* * * * *